US012611843B2

(12) United States Patent
Stowell et al.

(10) Patent No.: US 12,611,843 B2
(45) Date of Patent: Apr. 28, 2026

(54) FLAME LAMINATION ADDITIVE FOR POLYURETHANE FOAM

(71) Applicant: ICL-IP AMERICA INC., Tarrytown, NY (US)

(72) Inventors: Jeffrey Stowell, Wingdale, NY (US); Zhihao Chen, Floral Park, NY (US); Munjal Patel, Lindenhurst, IL (US)

(73) Assignee: ICL-IP AMERICA INC., Tarrytown, NY (US)

( * ) Notice: Subject to any disclaimer, the term of this patent is extended or adjusted under 35 U.S.C. 154(b) by 338 days.

(21) Appl. No.: 18/272,732

(22) PCT Filed: Jan. 7, 2022

(86) PCT No.: PCT/US2022/011540

§ 371 (c)(1),
(2) Date: Jul. 17, 2023

(87) PCT Pub. No.: WO2022/173532

PCT Pub. Date: Aug. 18, 2022

(65) Prior Publication Data

US 2024/0300210 A1 Sep. 12, 2024

Related U.S. Application Data

(60) Provisional application No. 63/147,895, filed on Feb. 10, 2021.

(51) Int. Cl.

| | |
|---|---|
| ***C08G 18/48*** | (2006.01) |
| ***B32B 5/24*** | (2006.01) |
| ***C08G 18/28*** | (2006.01) |
| ***C08G 18/76*** | (2006.01) |
| ***C08L 75/04*** | (2006.01) |
| ***C08L 75/08*** | (2006.01) |
| ***C09D 175/04*** | (2006.01) |
| ***C09D 175/08*** | (2006.01) |

(52) U.S. Cl.

CPC ............ *B32B 5/245* (2013.01); *C08G 18/288* (2013.01); *C08G 18/48* (2013.01); *C08G 18/7621* (2013.01); *B32B 2250/02* (2013.01); *B32B 2266/0278* (2013.01); *B32B 2307/546* (2013.01); *B32B 2605/08* (2013.01); *C08G 2150/60* (2013.01)

(58) Field of Classification Search

None

See application file for complete search history.

(56) References Cited

U.S. PATENT DOCUMENTS

| | | | | |
|---|---|---|---|---|
| 4,652,485 | A | 3/1987 | Fesman | |
| 2021/0079301 | A1 * | 3/2021 | Piotrowski ............ | B65D 83/38 |

FOREIGN PATENT DOCUMENTS

| | | | |
|---|---|---|---|
| EP | 0908464 | A1 | 4/1999 |
| EP | 2975186 | A1 | 1/2016 |

* cited by examiner

*Primary Examiner* — Sheeba Ahmed

(74) *Attorney, Agent, or Firm* — Dilworth & Barrese, LLP

(57) ABSTRACT

There is provided herein a polyurethane foam-forming composition comprising a hydroxyl-functional phosphonate of the general formula (I): wherein $R^1$-$R^4$ are as described herein. There is also provided a polyurethane comprising the reaction product of the polyurethane foam-forming composition and a process of making a laminated polyurethane comprising laminating a textile to a polyurethane, preferably a polyurethane foam.

(I)

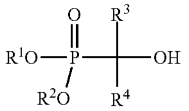

21 Claims, No Drawings

FLAME LAMINATION ADDITIVE FOR POLYURETHANE FOAM

This application claims priority to U.S. Provisional Application No. 63/147,895 filed on Feb. 10, 2021, the entire contents of which are incorporated herein by reference.

FIELD OF THE INVENTION

The present invention relates to a flame lamination additive, specifically to phosphorus containing flame lamination additive for polyurethane foam, and polyurethane foam articles made therefrom.

DESCRIPTION OF RELATED ART

Flame lamination additives are used to promote adhesive strength between a substrate (e.g., fabric/textile) and polyurethane foam in applications where these composite materials are produced, e.g., in automobile headliners. Some flame lamination additives are phosphorus containing materials. In general, due to the fast decomposition and poor resolidification properties of polyether polyurethane foams when exposed to flame, they do not result in creating a desirable level of adhesion between the polyurethane material and textile.

BRIEF SUMMARY OF THE INVENTION

There is provided herein a polyurethane foam-forming composition comprising:

(i) a polyol;

(ii) a polyisocyanate;

(iii) a catalyst; and, (iv) a hydroxyl-functional phosphonate of the general formula (I):

(I)

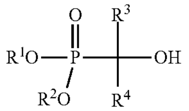

where each of $R^1$ and $R^2$ are each independently a linear or branched alkyl group of up to about 6 carbon atoms, or where $R^1$ and $R^2$ are joined to each other in order to form a substituted or unsubstituted ring of from 2 to about 12 carbon atoms, and $R^3$ and $R^4$ are each independently hydrogen or a linear or branched alkyl group of up to about 3 carbon atoms.

There is also provided herein a process of making a laminated polyurethane comprising laminating a textile to a polyurethane foam, wherein the polyurethane foam comprises the reaction product of (i)-(iv).

There is also provided a laminated polyurethane comprising a reacted hydroxyl-functional phosphonate of the general formula (I).

DETAILED DESCRIPTION OF THE INVENTION

The inventors herein have unexpectedly discovered that hydroxyl-functional phosphonate of the general formula (I), as described herein, can serve as a flame lamination additive for polyurethane materials such as flexible polyether-based polyurethane.

It will be understood herein that all ranges herein include all subranges there between and also any combination of endpoints of said ranges.

Unless indicated otherwise, all weight percentages herein are based on the total weight of the reaction components.

All temperatures herein are room temperature unless indicated otherwise.

All viscosity measurements recited herein are conducted at 25 degrees Celsius and using a Brookfield capillary viscometer. All pressures indicated herein are 1 atmosphere at sea level and at 25 degrees Celsius unless indicated otherwise.

In one more specific embodiment herein the general formula (I) as described above can be such where each of $R^1$ and $R^2$ is independently the same or different, linear or branched alkyl group of from 1 to about 6 carbon atoms, more specifically 1 to about 4 carbon atoms, even more specifically from 1 to about 3 carbon atoms, such as the non-limiting examples of methyl and ethyl; and wherein each of the above described $R^1$ and $R^2$ groups can be optionally joined to each other in order to form a ring of from 2 to 12 carbon atoms, preferably from 3 to 12 carbon atoms, more preferably from 3 to 10 carbon atoms, and even more preferably from 3 to 8 carbon atoms, and most preferably from 3 to 6 carbon atoms.

In one embodiment, each of $R^3$ and $R^4$ is hydrogen or a linear alkyl group of from 1 to about 3 carbon atoms, preferably any one of methyl, ethyl or propyl.

In one non-limiting embodiment, the hydroxyl-functional phosphonate of general formula (I) is one or more of the general formulae:

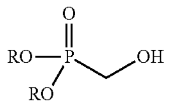

and/or, the general formula:

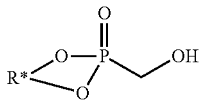

wherein each R is as described herein, and R* is a linear or branched divalent alkylene group of from 2 to about 12 carbon atoms, preferably from 3 to about 8 carbon atoms. R* preferably is a linear or branched divalent alkylene group containing from 3 to about 8 carbon atoms such as, for example, propylene, 2-methylpropylene, neopentylene or 2-butyl-2-ethylpropylene.

In one embodiment, the general formula (I) is such wherein each of $R^1$ and $R^2$ is a linear alkyl group of from 1 to about 4 carbon atoms, both of which are joined to each other in order to form a ring of the moiety (II):

(II)

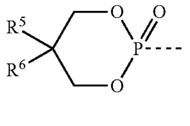

wherein each $R^5$ and $R^6$ are independently a linear or branched alkyl group of from 1 to about 6 carbon atoms, and wherein the dashed line represents a bond to the —C($R^3$)($R^4$)—OH moiety of formula (I).

Some non-limiting examples of hydroxyl-functional phosphonates of general formula (I) can include dimethyl hydroxymethylphosphonate, diethyl hydroxymethylphosphonate, diethyl hydroxyethylphosphonate, diethyl hydroxypropylphosphonate, dipropyl hydroxymethylphosphonate, diisopropyl hydroxymethylphosphonate, methyl ethyl hydroxymethylphosphonate, methyl propyl hydroxymethylphosphonate, methyl isopropyl hydroxymethylphosphonate, ethyl propyl hydroxymethylphosphonate, ethyl isopropyl hydroxymethylphosphonate, propyl isopropyl hydroxymethylphosphonate, dibutyl hydroxymethylphosphonate, dioctyl hydroxymethylphosphonate, propyl pentyl hydroxymethylphosphonate, dicyclohexyl hydroxymethylphosphonate,1,3,2-dioxaphosphorinane, 5-methyl-2-(hydroxymethyl), 2-oxide; 1,3,2-dioxaphosphorinane, 5,5-dimethyl-2-(hydroxymethyl), 2-oxide; 1,3,2-dioxaphosphorinane; 1,3,2-dioxaphosphorinane, 5-butyl-5-ethyl-2-(hydroxymethyl), 2-oxide, and combinations thereof.

The amount of the hydroxyalkylphosphonate of formula (I) to be used according to the present invention is usually in an amount of 1 to 15 pph, preferably from 2 to 10 pph, and most preferably from 2 to 8 pph based on the parts of the polyurethane foam forming composition.

The hydroxyalkylphosphonate of formula (I) can be advantageously utilized in polyurethane foam-forming compositions as a flame lamination additive for the polyurethane foam formed therefrom, i.e., following the reaction of the components (i)-(iv), optionally in the presence of a blowing agent, e.g., CO2 and the like. Such polyurethane foam-forming compositions, and those described herein, made using the polyurethane foam-forming composition, can be reacted to form polyurethane foams, which foams can be utilized in the construction, insulation and formation of various articles such automotive seat cushions, automotive head liners and the like.

In one embodiment herein the polyurethane foam forming composition and/or polyurethane foam formulation can be for a polyether-based polyurethane foam, and in further embodiments can be for a polyether-based polyurethane flexible foam.

The polyurethane foam forming composition of the present invention can contain all further components suitable for producing polyurethane foams. In particular, the compositions of the present disclosure contain, in addition to the hydroxyalkylphosphonate of formula (I), at least one isocyanate component and at least one polyol component and also, if appropriate, one or more blowing agents and if appropriate one or more urethane and/or isocyanurate catalysts.

Customary formulations for producing polyurethane systems, in particular polyurethane foams, contain one or more organic isocyanates having two or more isocyanate functions as isocyanate component, one or more polyols having two or more groups which are reactive toward isocyanate as polyol component, optionally catalysts for the isocyanate-polyol and/or isocyanate-water and/or isocyanate trimerization reactions, water, optionally physical blowing agents, optionally flame retardants and, if appropriate, further additives.

Suitable isocyanates that can be employed are preferably all polyfunctional organic isocyanates, for example, diphenylmethane 4,4'-diisocyanate (MDI), toluene diisocyanate (TDI), hexamethylene diisocyanate (HMDI) and isophorone diisocyanate (IPDI). The mixture of MDI and highly condensed analogues having an average functionality of from 2 to 4 which is known as "polymeric MDI" ("crude MDI") and also the various isomers of TDI in pure form or as isomer mixture are particularly useful.

As polyol components, preference is given to using polyols which have an equivalent weight (=number average molecular weight/functionality) of greater than 400 g/mol, preferably greater than 500 g/mol and particularly preferably greater than 750 g/mol. Preferred polyol components are compounds which have a number average molecular weight of from 1000 to 8000, preferably from 1500 to 6000.

Suitable polyols are, in particular, those having at least two, preferably from 2 to 8, more preferably from 2 to 5, H atoms which are reactive towards isocyanate groups. Preference is given to using polyether polyols. Such polyols can be prepared by known methods, for example, by anionic polymerization of alkylene oxides in the presence of alkali metal hydroxides or alkali metal alkoxides as catalysts with addition of at least one starter molecule containing from 2 to 3 reactive hydrogen atoms in bound form, or by cationic polymerization of alkylene oxides in the presence of Lewis acids, for example, antimony pentachloride or boron fluoride etherate, or by double metal cyanide catalysis. Suitable alkylene oxides preferably contain from 2 to 4 carbon atoms in the alkylene radical. Examples are ethylene oxide, 1,2-propylene oxide, tetrahydrofuran, 1,3-propylene oxide, 1,2- or 2,3-butylene oxide. Preference is given to using ethylene oxide and/or 1,2-propylene oxide. The alkylene oxides can be used individually, alternately in succession or as mixtures. As starter molecules, it is possible to use, for example, water or 2- and/or 3-hydric alcohols, e.g. ethylene glycol, 1,2- and 1,3-propanediol, diethylene glycol, dipropylene glycol, glycerol, trimethylolpropane, etc. Polyfunctional polyols such as sugar can also be used as starters. Preferred polyether polyols are polyoxypropylenepolyoxyethylene polyols which preferably have a functionality of from 2 to 8 and/or preferably a number average molecular weight of from 1000 to 8000, more preferably from 1200 to 3500. Further polyols are known to those skilled in the art and may be found in, for example, EP-A-0 380 993 or U.S. Pat. No. 3,346,557, which are fully incorporated herein by reference.

For producing molded foams and highly elastic flexible foams, preference is given to using bifunctional and/or trifunctional polyether alcohols which have primary hydroxyl groups, in particular polyether alcohols having an ethylene oxide block at the end of the chain or polyether alcohols based only on ethylene oxide.

For producing slabstock flexible foams, preference is given to using bifunctional and/or trifunctional polyether alcohols which have secondary hydroxyl groups, in particular polyether alcohols having a propylene oxide block or random propylene oxide and ethylene oxide block at the end of the chain or polyether alcohols based only on propylene oxide blocks.

Suitable polyester polyols are based on esters of polybasic carboxylic acids (which may be either aliphatic, for example adipic acid, or aromatic, for example phthalic acid or terephthalic acid) with polyhydric alcohols (usually glycols).

A suitable ratio of isocyanate and polyol, expressed as index of the composition, is in the range from 10 to 1000, preferably from 80 to 350, where 100 indicates a molar ratio of the reactive isocyanate groups to reactive OH groups of 1:1.

Suitable catalysts that can be employed in this disclosure are substances which catalyze the gelling reaction (isocyanate-polyol), the blowing reaction (isocyanate-water) or the dimerization or trimerization of the isocyanate. Typical examples are the amines triethylamine, dimethylcyclohexylamine, tetramethylethylenediamine, tetramethylhexanediamine, pentamethyldiethylenetriamine, pentamethyldipropylenetriamine, triethylenediamine, dimethylpiperazine, 1,2-dimethylimidazole, N-ethylmorpholine, tris(dimethylaminopropyl)hexahydro-1,3,5-triazine, dimethylaminoethanol, dimethyl-aminoethoxyethanol and bis(dimethylaminoethyl)ether, tin compounds such as dibutyltin dilaurate or tin-octoate and potassium salts such as potassium acetate.

Suitable amounts to be used depend on the type of catalyst and are usually in the range from 0.05 to 5 pphp (=parts by weight based on 100 parts by weight of polyol) or from 0.1 to 10 pphp for potassium salts.

Suitable water contents that can be employed depend on whether or not physical blowing agents are used in addition to water. In the case of purely water-blown foams, the values are typically from 1 to 20 pphp, but if other blowing agents are additionally used, the amount to be used is reduced to usually from 0.1 to 5 pphp. To achieve higher foam densities, preference is given to using neither water nor other blowing agents.

Suitable physical blowing agents that can be employed in this disclosure are gases, for example $CO_2$ Apart from water and, if appropriate, physical blowing agents, it is also possible to use other chemical blowing agents which react with isocyanates to evolve gas, for example formic acid or carbonates.

Suitable flame retardants that can be employed are preferably liquid organic phosphorus compounds such as halogen-free organic phosphates, e.g., aliphatic phosphates, aromatic phosphates, mixed aromatic aliphatic phosphates, aliphatic bisphosphates, aromatic bisphosphates, mixed aliphatic aromatic bisphosphates, oligomeric phosphates, polymeric phosphates and combinations thereof. In one embodiment, the aliphatic moieties can be any of alkyl, alkenyl and alkynyl of up to 20 carbon atoms, preferably up to 12 carbon atoms and most preferably up to 8 carbon atoms. In another embodiment, the aryl moieties can contain from 6 to 20 carbon atoms, from 6 to 12 carbon atoms and from 6 to 8 carbon atoms. Some suitable examples of phosphates are aryl phosphate ester such as a butylated triphenyl phosphate ester, alkyl/aryl phosphate ester (e.g., 2-ethylhexyl diphenyl phosphate, isodecyl diphenyl phosphate), cresyl diphenyl phosphate, resorcinol bis(diphenyl phosphate), bisphenol A bis(diphenyl phosphate), tris(2-butoxyethyl) phosphate, tris (2-chloropropyl) phosphate, tris(1,3-dichloroisopropyl) phosphate, diethyl-N,N-bis(hydroxyethyl)aminomethylphosphonate, oligomeric alkyl phosphate and/or phosphonate esters and combinations thereof.

In one specific embodiment herein, the phosphate is an aromatic phosphate compound, preferably an aromatic phosphate ester containing three aryl moieties, or a bisphosphate containing four aryl moieties.

Examples of commercial phosphate esters useful herein are triaryl phosphate esters such as those selected from the group consisting of triphenyl phosphate, tricresyl phosphate, mixed phenyl cresyl phosphates, trixylyl phosphate, mixed phenyl xylyl phosphates, trimesityl phosphate, mixed mesityl phenyl phosphates, tris(propylphenyl) phosphate, mixed propylphenyl phenyl phosphates, tris(isopropylphenyl) phosphate, mixed isopropylphenyl-phenyl phosphates, tris (butylphenyl) phosphate, mixed butylphenyl phenyl phosphates, tris(isobutylphenyl) phosphate, mixed isobutyl-phenyl phenyl phosphates, tris(t-butylphenyl) phosphate, mixed t-butylphenyl phenyl phosphates and combinations thereof.

Further, as the phosphate component herein are the aromatic bisphosphate esters including those selected from the group consisting of hydroquinone bis(diphenyl phosphate), resorcinol bis(diphenyl phosphate) (Fyrolflex® RDP, ICL-IP America, Tarrytown, NY), bisphenol A bis(diphenyl phosphate) (Fyrolflex® BDP, ICL-IP America, Tarrytown, NY), neopentyl glycol bis(diphenyl phosphate), propylene glycol bis(diphenyl phosphate), and their combinations. Of these phosphate esters, resorcinol bis(diphenyl phosphate) and bisphenol A bis(diphenyl phosphate) and combinations thereof are most preferred.

Furthermore, halogenated compounds, for example, halogenated polyols, and also solids such as expandable graphite and melamine are suitable as flame retardants.

The polyurethane foam of the present disclosure can be obtained by processing or foaming a composition according to the present disclosure. Preferred polyurethane systems or foams according to the present disclosure comprise from 0.05 to 10% by mass, preferably from 0.1 to 5% by mass and particularly preferably from 0.3 to 2% by mass, of organic phosphorus compounds (I) or organic phosphorus compounds (I) incorporated by reaction, based on the system or the foam. The content can be determined in a simple way by determining the phosphorus content from the molecular weight of the phosphorus compounds used. Polyurethane systems or polyurethane foams having preferred phosphorus contents which can be calculated from the above-mentioned amounts to be used are therefore likewise provided by the present disclosure.

The processing of the composition to form polyurethane systems, in particular polyurethane foams, can be carried out by all methods with which a person skilled in the art will be familiar, for example in manual mixing processes or preferably with the aid of high-pressure foaming machines. It is also possible to use batch processes, for example for the production of molded foams. The polyurethane foams described herein, be they be can be utilized in the construction and formation of various articles such as furniture, bedding, and automotive seat cushions, more specifically, furniture applications, automotive applications, boating applications, bus seating applications, train seating applications, RV seating applications, office furniture seating applications, aviation applications, tractor applications, bicycle applications, engine mount applications, compressor applications, bedding applications, insulation applications, sporting goods applications, shoe applications, carpet cushioning applications, packaging applications, textile applications, buffer cushioning applications, HVAC applications, tent applications, life raft applications, luggage applications, and hand bag applications.

Flexible slabstock polyurethane foam can be used for furniture, e.g., upholstered furniture, such as cushions, backs and arms, the automotive industry, such as seat and back cushions, and head linings and head rests, for automobiles and trucks, for public transport seating, such as busses and airplanes, as well as in any of tractor, bicycle and motorcycle seats including, but not limited to vehicle seat bottom and back bolsters, and armrests, as well as support rings for run flat tires, and other automobile interior components; bedding such as mattresses, as sound insulation materials, automobile interior components such as an arm rest, a steering wheel and a shift lever knob, shoe soles, and sporting goods.

The laminated structure of the present disclosure contains or consists of a polyurethane system, in particular polyurethane foam, which is hot adhesively bonded to a substrate.

As substrates, the structure can contain, for example, a woven fabric, a nonwoven or a felt, a natural or synthetic fiber such as cotton, wool, silk, linen, jute, sisal, Nylon, polyester, polyacrylonitrile, Rayon, polyurethane Spandex, a plastic film, e.g., a film produced using polyvinyl chloride, polyethylene, polypropylene, polystyrene, a metal, a wood or a composite.

The laminated structure of the present disclosure can be obtained by the process of this disclosure for producing a laminated polyurethane system according to the present disclosure, in particular a polyurethane foam according to the present disclosure, is hot adhesively bonded to a substrate.

Although the present invention has been described with reference to particular means, materials and embodiments, from the foregoing description, one skilled in the art can easily ascertain the essential characteristics of the present invention and various changes and modifications can be made to adapt the various uses and characteristics without departing from the spirit and scope of the present invention as described above.

EXAMPLES

In this evaluation, five products were chosen and evaluated in 1.8 lb/ft3 TDCP containing polyether foam: Niax FLE-200LF (flame lamination additive available from Momentive), Vircol 82 (reactive flame retardant from Solvay), Victastab HMP (ICL), Fyrol 6 (ICL) and VeriQuel R100 (ICL).

The polyurethane formulation contained 3 pph of each product, followed by an in-house flame lamination application test of each foam produced. After 24 hours the laminated samples were tested for delamination force using the Instron per ASTM D3574 F. It was found that VeriQuel R100 can promote adhesive strength and produce comparable result to the commercial product from Momentive FLE-200LF. Victastab HMP, Fyrol 6 and Vircol 82 also promote adhesive properties, but not as significant as R100.

Details of the Experiments:

A total of 6 foam samples were prepared using the formulation shown in the table below. A loading level of 8 pph of TDCP, which is the typical MVSS 302 SE passing loading, was used in each formulation. Foams containing no flame laminate additive, FLE-200LF, HMP, Fyrol 6, R100 and Vircol 82 were made and cut into 7×3×0.5 inch slices.

The flame lamination samples were then prepared using a laboratory flame lamination set-up. The foam specimen and a piece of the same size fabric were hung using a paper clip on a support with constant moving speed of 1 cm/sec. The support structure can be moved in the vertical direction (up and down). A wingtip burner using propane gas was held on a stand at a 45° angle. The amount of gas supplied was set so that a blue flame with 1 in height and 2 in width was obtained. The burner was placed about 1 inch from the foam sample while at the same time moving the mechanical support up. The partially burned foam sample and fabric were systematically pressed as the foam and fabric pieces came together in the roller. The dual roller was set for a 0.35-inch separation distance. The laminated foam/fabric was then placed between two flat surfaces under a constant pressure for 24 hours to allow the final bond strength to develop.

The delamination force of each composite sample was measured according to ASTM D3574 F with a peeling speed of 100 mm/min. According to the results, foam without any flame lamination additive had little/no bonding force. The foam samples containing the above flame lamination additives did promote higher bonding strength and resulted a higher delamination force compare to the No FLA foam. Among the products tested, FLE-200 LF and VeriQuel R100 performed the best with a delamination force above 5 N and 5.5 N respectively, followed by Victastab HMP at 3.0 N, Vircol 82 at 2.3 N and Fyrol 6 at 1.5 N.

Due to the reactivity nature (hydroxyl containing) of all the products, minor catalyst adjustments were required to produce comparable air flow foams. The effect on the reactive nature of each additive was manageable except in the case of Fyrol 6, which caused a significant loss in air flow. Repeatability between specimens in the delamination test was relatively low, which was indicated by large variation in delamination force.

| | | Exp ID | | | | | |
|---|---|---|---|---|---|---|---|
| | | 2269-54-1 | 2269-54-2 | 2269-54-3 | 2269-54-4 | 2269-54-5 | 2269-54-6 |
| | | FLA used | | | | | |
| | OH # | No | FLE-200LF | HMP | Fyrol 6 | R100 | Vircol 82 |
| Polyol 8136 | 54 | 100 | 100 | 100 | 100 | 100 | 100 |
| FR-2 | 0 | 8 | 8 | 8 | 8 | 8 | 8 |
| FLE-200 LF | 464 | | 3 | | | | |
| Victastab HMP | 363 | | | 3 | | | |
| Fyrol 6 | 460 | | | | 3 | | |
| VeriQuel R100 | 280 | | | | | 3 | |
| Vircol 82 | 205 | | | | | | 3 |
| D33LV/BL-11 (3:1) | 461 | 0.25 | 0.25 | 0.25 | 0.25 | 0.25 | 0.25 |
| L-620 | 0 | 0.8 | 0.8 | 0.8 | 0.8 | 0.8 | 0.8 |
| Water | 6233 | 3.55 | 3.55 | 3.55 | 3.55 | 3.55 | 3.55 |
| T-9 (ml) | | 0.08 | 0.06 | 0.06 | 0.06 | 0.06 | 0.06 |
| A-side:TD 80 | | 47.2 | 49.6 | 49.1 | 49.3 | 48.6 | 48.3 |
| Index | | 110 | 110 | 110 | 110 | 110 | 110 |
| Observations | | | | | | | |
| Crm time | sec | 8 | 8 | 8 | 8 | 8 | 8 |
| Blow off/End of Rise | sec | 104 | 113 | 172 | 115 | 132 | 142 |

-continued

| | | Exp ID | | | | | |
|---|---|---|---|---|---|---|---|
| | | 2269-54-1 | 2269-54-2 | 2269-54-3 | 2269-54-4 | 2269-54-5 | 2269-54-6 |
| | | FLA used | | | | | |
| | OH # | No | FLE-200LF | HMP | Fyrol 6 | R100 | Vircol 82 |
| Physical Performance | | | | | | | |
| Density | lb/ft3 | 1.95 | 2 | 2 | 2 | 2 | 2 |
| Air Flow | cfm | 2.5 | 2.1 | 2.1 | 0.5 | 2.3 | 2.5 |
| Delamination Force | N | 0.3 ± 0.1 | 5.0 ± 1.3 | 3.0 ± 1.6 | 1.5 ± 0.4 | 5.5 ± 1.1 | 2.3 ± 0.1 |

The invention claimed is:

1. A polyurethane foam-forming composition comprising:

(i) a polyol;

(ii) an isocyanate;

(iii) a catalyst; and, (iv) a hydroxyl-functional phosphonate of the general formula (I):

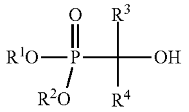

(I)

where each of $R^1$ and $R^2$ are each independently a linear or branched alkyl group of up to about 6 carbon atoms, or where $R^1$ and $R^2$ are joined to each other in order to form a substituted or unsubstituted ring of from 2 to about 12 carbon atoms, and $R^3$ and $R^4$ are each independently hydrogen or a linear or branched alkyl group of up to about 3 carbon atoms.

2. The polyurethane foam-forming composition of claim 1, wherein $R^1$ and $R^2$ are joined together to form a ring of from 3 to 6 carbon atoms.

3. The polyurethane foam-forming composition of claim 1, wherein $R^1$ and $R^2$ are selected from the group consisting of methyl and ethyl.

4. The polyurethane foam-forming composition of claim 1, wherein the hydroxyl-functional phosphonate is selected from the group consisting of dimethyl hydroxymethylphosphonate, diethyl hydroxymethylphosphonate, diethyl hydroxyethylphosphonate, diethyl hydroxypropylphosphonate, dipropyl hydroxymethylphosphonate, diisopropyl hydroxymethylphosphonate, methyl ethyl hydroxymethylphosphonate, methyl propyl hydroxymethylphosphonate, methyl isopropyl hydroxymethylphosphonate, ethyl propyl hydroxymethylphosphonate, ethyl isopropyl hydroxymethylphosphonate, propyl isopropyl hydroxymethylphosphonate, dibutyl hydroxymethylphosphonate, dioctyl hydroxymethylphosphonate, propyl pentyl hydroxymethylphosphonate, dicyclohexyl hydroxymethylphosphonate, 1,3,2-dioxaphosphorinane, 5-methyl-2-(hydroxymethyl), 2-oxide; 1,3,2-dioxaphosphorinane, 5,5-dimethyl-2-(hydroxymethyl), 2-oxide; 1,3,2-dioxaphosphorinane, 1,3,2-dioxaphosphorinane, 5-butyl-5-ethyl-2-(hydroxymethyl), 2-oxide and combinations thereof.

5. The polyurethane foam-forming composition of claim 1, wherein the hydroxyl-functional phosphonate is present in an amount of from 1 to 15 pph based on the weight of the polyurethane foam-forming composition.

6. The polyurethane foam-forming composition of claim 1, wherein the polyol is a polyether polyol.

7. A polyurethane foam comprising the reaction product of the polyurethane foam-forming composition of claim 1.

8. A polyether-based polyurethane foam comprising the reaction product of the polyurethane foam forming composition of claim 1.

9. A flexible polyether-based polyurethane foam comprising the reaction product of the polyurethane foam forming composition of claim 1.

10. A laminate comprising a textile and the polyurethane foam of claim 1.

11. An automobile component comprising the laminate of claim 10.

12. A process of making a laminated polyurethane comprising laminating a textile to a polyurethane foam, wherein the polyurethane foam comprises the reaction product of (i) a polyol;

(ii) an isocyanate;

(iii) a catalyst; and, (iv) a hydroxyl-functional phosphonate of the general formula (I):

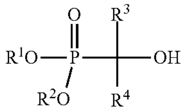

(I)

where each of $R^1$ and $R^2$ are each independently a linear or branched alkyl group of up to about 6 carbon atoms, or where $R^1$ and $R^2$ are joined to each other in order to form a substituted or unsubstituted ring of from 2 to about 12 carbon atoms, and $R^3$ and $R^4$ are each independently hydrogen or a linear or branched alkyl group of up to about 3 carbon atoms.

13. The process of claim 12 wherein, wherein $R^1$ and $R^2$ are joined together to form a ring of from 3 to 6 carbon atoms.

14. The process of claim 12 wherein $R^1$ and $R^2$ are selected from the group consisting of methyl and ethyl.

15. The process of claim 12 wherein the hydroxyl-functional phosphonate is selected from the group consisting of dimethyl hydroxymethylphosphonate, diethyl hydroxymethylphosphonate, diethyl hydroxyethylphosphonate, diethyl hydroxypropylphosphonate, dipropyl hydroxymethylphosphonate, diisopropyl hydroxymethylphosphonate, methyl ethyl hydroxymethylphosphonate, methyl propyl hydroxymethylphosphonate, methyl isopropyl hydroxymethylphosphonate, ethyl propyl hydroxymethylphosphonate, ethyl isopropyl hydroxymethylphosphonate, propyl isopropyl hydroxymethylphosphonate, dibutyl hydroxymethylphosphonate, dioctyl hydroxymethylphosphonate, propyl pentyl hydroxymethylphosphonate, dicyclohexyl hydroxymethylphosphonate,1,3,2-dioxaphosphorinane, 5-methyl-2-(hydroxymethyl), 2-oxide; 1,3,2-dioxaphosphorinane, 5,5-dimethyl-2-(hydroxymethyl), 2-oxide; 1,3,2-dioxaphosphorinane, 5-butyl-5-ethyl-2-(hydroxymethyl), 2-oxide and combinations thereof.

16. The process of claim 12 wherein the polyol is a polyether polyol.

17. The process of claim 12 wherein the polyurethane foam is a flexible polyether based polyurethane foam.

18. A laminated polyurethane comprising a reacted hydroxyl-functional phosphonate of the general formula (I):

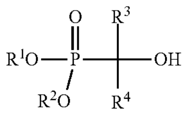

(I)

where each of $R^1$ and $R^2$ are each independently a linear or branched alkyl group of up to about 6 carbon atoms, or where $R^1$ and $R^2$ are joined to each other in order to form a substituted or unsubstituted ring of from 2 to about 12 carbon atoms, and $R^3$ and $R^4$ are each independently a hydrogen or a linear or branched alkyl group of up to about 3 carbon atoms.

19. An automobile component comprising the laminated polyurethane of claim 18.

20. An automobile head liner comprising the laminated polyurethane of claim 18.

21. An article selected from the group consisting of furniture, bedding, furniture applications, automotive applications, boating applications, bus seating applications, train seating applications, RV seating applications, office furniture seating applications, aviation applications, tractor applications, bicycle applications, engine mount applications, compressor applications, bedding applications, insulation applications, sporting goods applications, shoe applications, carpet cushioning applications, packaging applications, textile applications, buffer cushioning applications, HVAC applications, tent applications, life raft applications, luggage applications, and hand bag applications wherein the article comprises the polyurethane foam of claim 7.

* * * * *